United States Patent [19]

Lespagnol et al.

[11] Patent Number: 5,237,564
[45] Date of Patent: Aug. 17, 1993

[54] FRAME SWITCHING RELAY FOR ASYNCHRONOUS DIGITAL NETWORK

[75] Inventors: Albert Lespagnol; Jean-Paul Quinouis, both of Perros Guirec, France

[73] Assignee: France Telecom, Paris, France

[21] Appl. No.: 680,197

[22] Filed: Apr. 5, 1991

[30] Foreign Application Priority Data

Apr. 6, 1990 [FR] France ............... 90 04438

[51] Int. Cl.$^5$ ............... H04Q 11/04; H04J 3/24
[52] U.S. Cl. ............... 370/60.1; 370/94.1; 370/58.1; 370/58.2; 370/60
[58] Field of Search ............... 370/58.1, 58.2, 58.3, 370/60.1, 60, 94.1

[56] References Cited

U.S. PATENT DOCUMENTS

| | | | |
|---|---|---|---|
| 4,603,416 | 7/1986 | Servel et al. | 370/60 |
| 4,884,264 | 11/1992 | Servel et al. | 370/58.1 |
| 4,905,225 | 2/1990 | Francois et al. | 370/60 |
| 4,933,932 | 6/1990 | Quinquis et al. | 370/60 |
| 5,046,064 | 9/1991 | Suzuki et al. | 370/94.1 |
| 5,079,762 | 1/1992 | Tanabe | 370/94.1 |

Primary Examiner—Douglas W. Olms
Assistant Examiner—Chau T. Nguyen
Attorney, Agent, or Firm—Jacobson, Price, Holman & Stern

[57] ABSTRACT

A frame switching relay switches frames between input and output paths by multiplexing of the paths at frame cell level. A frame is divided into cells having a constant number of bits, whereas the frames are of variable length. The switching relay only retransmits frames that have been completely written in the buffer memory. A context memory preserves the address of the first cell at the start of the writing of a frame in the buffer memory, and memorizes the address of the output path for which the frame is destined, until the frame is completely written. A checking circuit checks that the writing of the frame does not cause an "overflow" in the buffer memory, by updating the number of cells awaiting reading and respectively associated with the output paths. If there is no overflow, the address of the first cell of the frame is written in one of the address queues as a function of the destination output path address. The frame is subsequently read by incrementation of the address of the first cell until the end of the frame is detected.

6 Claims, 8 Drawing Sheets

CELL BOM/SSM

FRAME SWITCHING RELAY FOR ASYNCHRONOUS DIGITAL NETWORK

BACKGROUND OF THE INVENTION

1. Field of the Invention

The present invention relates to a switching relay in an asynchronous digital network for switching frames between input paths and output paths. Each frame is divided into successive cells having a predetermined number of bits.

2. State of the Prior Art

A switching relay for synchronous packets of fixed length is described in U.S. Pat. No. 4,603,416. From the point of view of switching, each packet according to this U.S. patent can be considered as substantially analogous to a frame cell according to the present invention. In other words, the cells have a predetermined constant number of bits and are detected in the input paths in order to multiplex them and to temporarily memorize them in a buffer memory. However, unlike the memorizing of a packet according to the aforesaid patent, in order to read a frame in the buffer memory, it is necessary to ensure that the frame has been written completely.

OBJECT OF THE INVENTION

The main object of this invention is to provide a switching relay for cell frames having variable lengths while referring to the general structure of a switching relay described in U.S. Pat. No. 4,603,416 in order to only retransmit frames that have been completely written in the buffer memory to the output paths.

SUMMARY OF THE INVENTION

Accordingly, there is provided a switching relay in an asynchronous digital network for switching frames between input paths and output paths, each of the frames being divided into successive cells having a predetermined number of bits, and a first cell in a frame comprising a path identifier.

The switching relay comprises:
- an input stage for detecting the frame cells received by the input paths so as to multiplex detected cells into cells multiplexed per path cycle,
- a cyclically write addressed buffer memory for memorizing the multiplexed cells,
- a translation memory for replacing the path identifier by a new identifier and for associating a destination output path address with this new identifier,
- plural read addressing means respectively associated with the output paths for each memorizing addresses relating to cells memorized in the buffer memory and destined for the associated output path,
- an output stage for demultiplexing the cells in the buffer memory under the control of the read addressing means, into demultiplexed cells forming frames transmitted to the output paths,
- a context memory for memorizing, for each input path, the address of the first cell in relation to a frame received by said input path and being written in the buffer memory, and simultaneously the destination output path address supplied by the translation memory, in response to a first cell detected by said frame,
- means for memorizing numbers of memorized cells in relation to frames being written and received respectively by said input paths, each of said numbers being reset at the beginning of a frame received by the associated input path and being incremented by one unity, in response to the memorizing of a cell contained in said frame,
- a control memory for memorizing numbers of cells to be retransmitted respectively in the output paths and contained in frames having been completely written in the buffer memory, and
- means for incrementing and decrementing said numbers of cells to be retransmitted, a number of cells to be retransmitted associated with an output path being incremented with the number of memorized cells contained in a frame being memorized and destined for said output path in response to the last cell of said frame, in order to compare the sum of said number of cells to be retransmitted and said number of memorized cells with a capacity of the buffer memory in relation to the cells per input path, to write the address of the first cell of said frame in the write addressing means associated with said output path when the sum is less than said capacity and to decrement by one unity the number of cells to be retransmitted in response to each cell of said frame read in the buffer memory.

According to other features of the invention, the switching relay comprises means for detecting in each of the multiplexed cells a cell type word thereby deriving a start-of-frame signal in response to a first cell in a frame containing several cells or in response to a cell containing a complete frame, and an end-of-frame signal in response to a last cell in a frame containing several cells or in response to a cell containing a complete frame. For each input path, the respective start-of-frame signal controls the writing of the destination output path address and the address of the first frame cell in the context memory, as well as the resetting of the frame cell number. For each output path, the end-of-frame signal controls the incrementing of the number of cells to be retransmitted and, when said sum is lower than said buffer memory capacity, the transfer of the address of the first frame cell from the context memory to the associated read addressing means.

According to another feature of the invention, the switching relay comprises means cyclically receiving first-cell addresses respectively read in the read addressing means for deducing, for each frame being written in the buffer memory, the addresses of the cells of said frame as a function of the address of the first cell of said frame.

BRIEF DESCRIPTION OF THE DRAWINGS

Further features and advantages of the invention will be apparent from the following particular description of a preferred embodiment of the invention with reference to the corresponding accompanying drawings in which.

DESCRIPTION OF THE PREFERRED EMBODIMENTS

As an example, a prior definition is provided hereinafter of the contents of the "data cells" constituting digital frames that a switching relay embodying the invention receives, switches and transmits.

Figure 1:
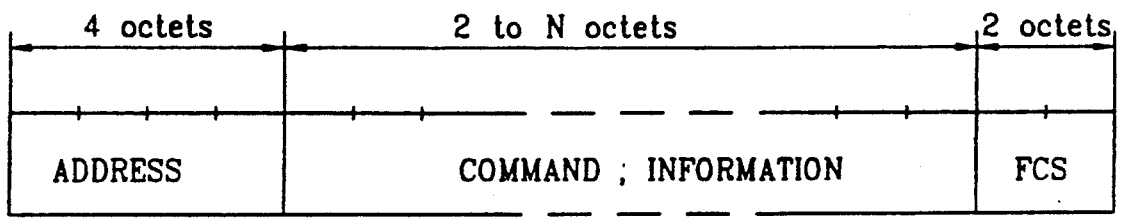
FIG. 1 schematically shows the structure of a digital frame.

Hereinafter is adopted a frame format which is, in the main, schematically represented in FIG. 1. A frame is derived by a terminal of an asynchronous time-division digital network ATN in which the switching relay is included. Such a frame is comprised of a 4-octet address field, of a command and information field having at least 2 octets, and of a 2-octet frame control sequence (FCS) field. Each frame is divided into 47-octet segments, in order to be transmitted in the network ATN; thus, when the number of octets in the command and information field is lower than a multiple of 47, the frame is consequently completed by non-significant octets.

Figure 2:
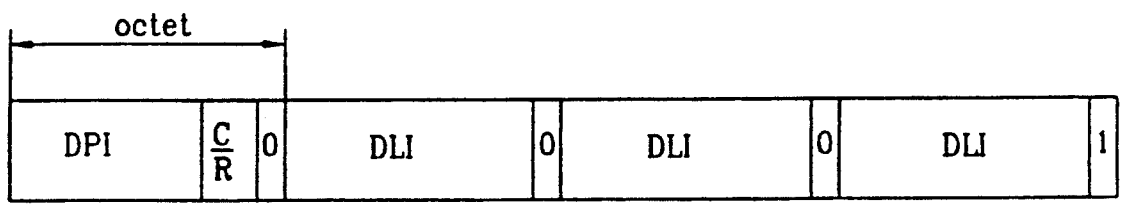
FIG. 2 schematically shows the structure of the address field in a frame.

The address field is structured as indicated in FIG. 2 and comprises a predetermined first octet that is of no significance for this invention, and three other octets defining a data link identifier DLI. This identifier is a logic connection identifier having local significance. The value of this identifier is determined at the time of establishing the connection by the terminal that must transmit the frame, then by the switching relay crossed by the frame. There is no need to process all the bits of the identifier DLI in each frame relay; the number of processed bits of the identifier determines the size of a translation and routing memory MTA included in the relay.

The FCS field is a 16-bit sequence that enables transmission errors to be detected on reception.

Figure 3:
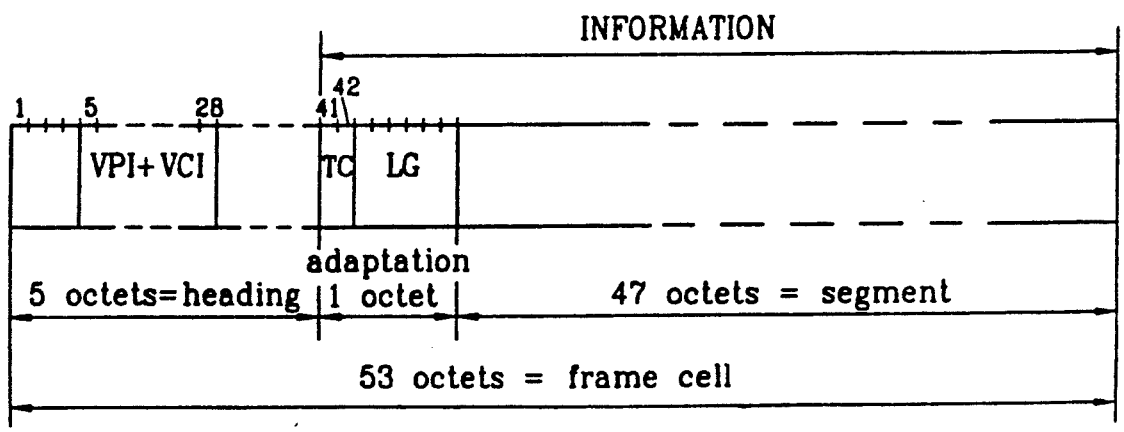
FIG. 3 schematically shows the structures of a frame cell.

Each 47-octet segment produced by the dividing up of a frame is included beforehand in a 53-octet data cell. As shown in FIG. 3, the format of a cell comprises a 5-octet heading and a 48-octet information field.

The heading is in turn structured into sub-fields, including a field VPI corresponding to the bits of rank 5 to 12 and a field VCI corresponding to the bits of rank 13 to 28. The fields VPI and VCI identify an asynchronous time-division link. A cell containing no information is said to be empty, and is signalled by $VPI=VCI=0$.

In the information field of a cell, the frame segment is preceded by a one-octet adaptation field. The adaptation field is structured into two sub-fields TC and LG. The first sub-field TC comprises two cell-type bits taking on the following values:

"10" for a first cell BOM of a frame,

"00" for an intermediary cell COM between the first and last cells of a frame,

"01" for an end-of-frame cell EOM, and

"11" for a cell SSM containing a complete frame.

The second sub-frame LG has 6 bits which are significant in the cells EOM and SSM and which indicate the number of octets used in the cell.

Figure 4:
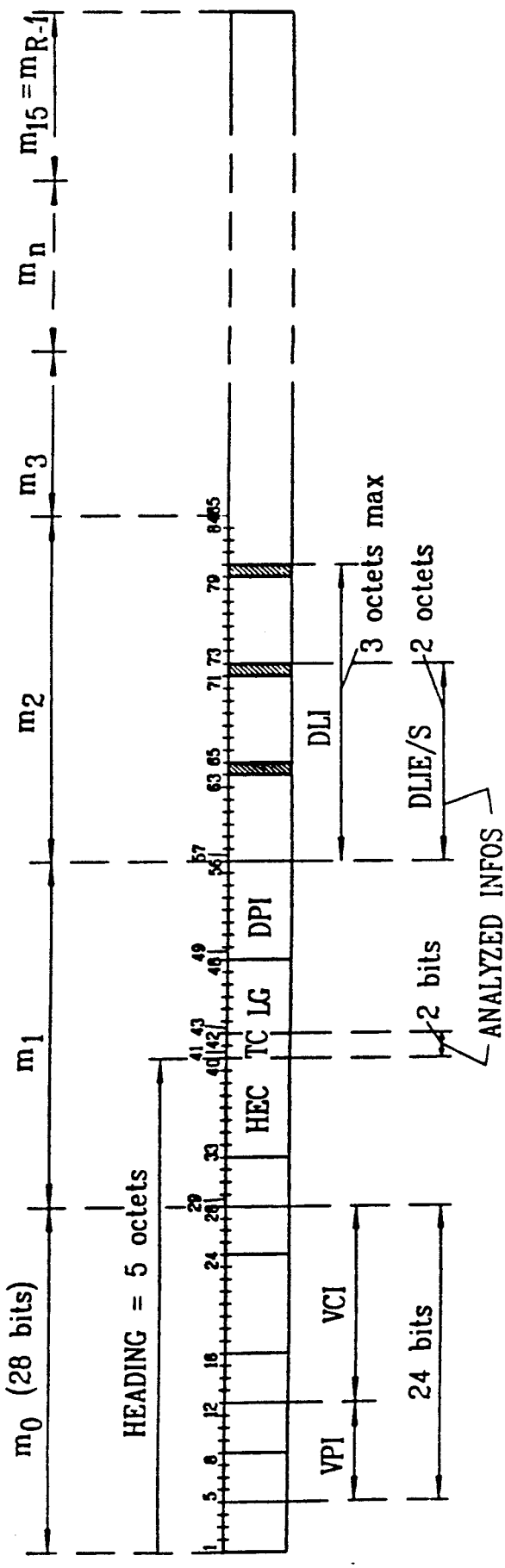
FIG. 4 shows the detailed structure of a cell of the first frame cell type or complete frame containing cell type.

When a frame is segmented, the first cell BOM or SSM of the frame contains, as shown in FIG. 4, the fields VPI, VCI, TC, LG and DLI, which are the only frames processed by the frame switching relay.

Figure 5:
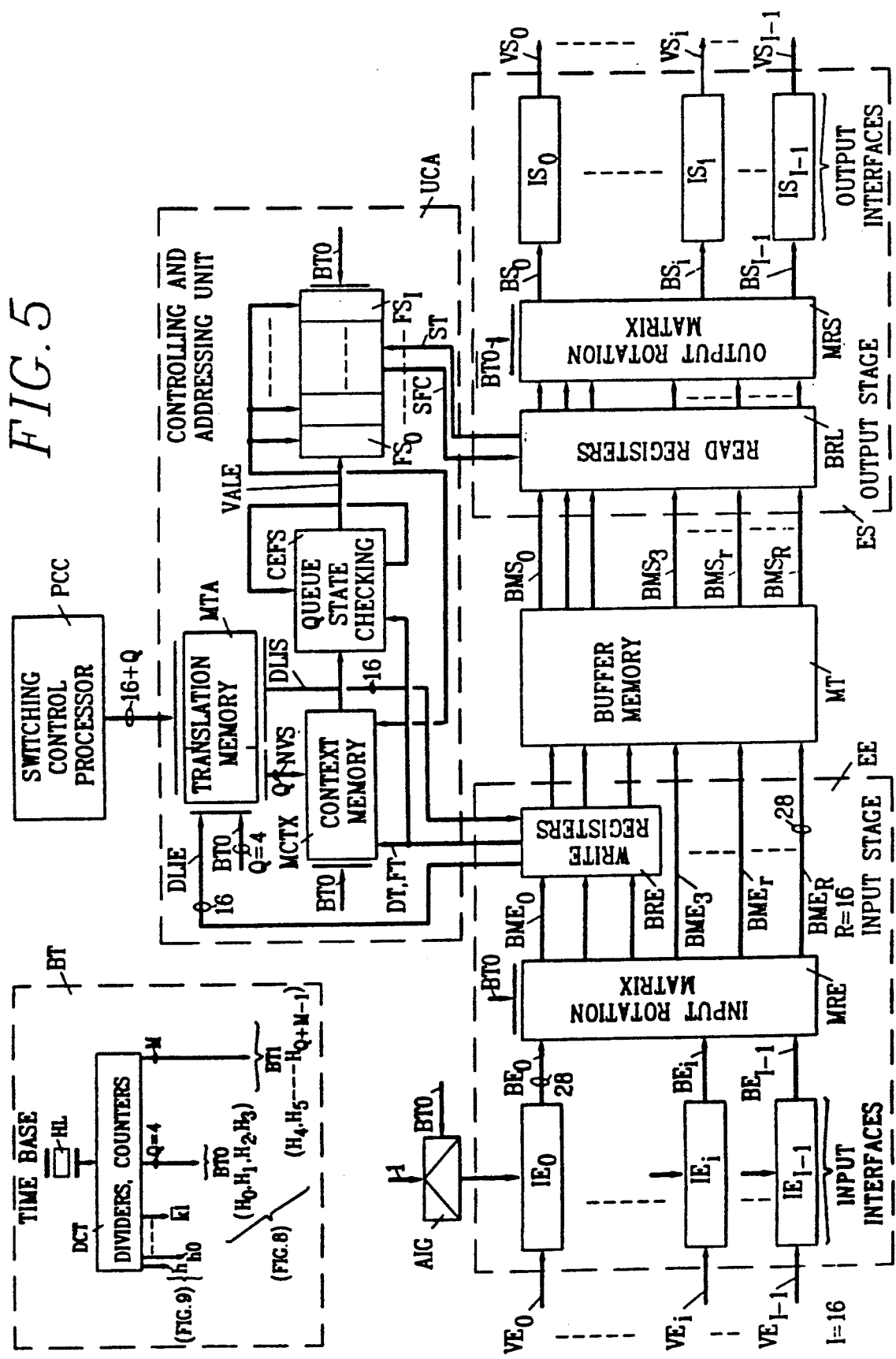
FIG. 5 is a schematic block-diagram of a frame switching relay embodying the invention.

As shown schematically in FIG. 5, the frame switching relay is mainly comprised of an input stage EE, a buffer memory MT, an output stage ES, a command and addressing unit UCA, a switching control processor PCC and a time base BT.

The relay switches the frames in the form of cells between I asynchronous time-division digital input paths $VE_0$ to $VE_{I-1}$ and I asynchronous time-division output paths $VS_0$ to $VS_{I-1}$. The incoming frames in the input paths, like the outgoing frames in the output paths, are not interlaced. In other words, in an input or output path, the cells of a frame are not separated by the cells of another frame; all the cells of a frame are contiguous on arrival at the frame relay, i.e., are not separated by empty cells.

The purpose of the input stage EE is to direct the data TC and DLI, of a frame taking part in the relay function, to the controlling and addressing unit UCA and to apply in writing residual informations of each frame in the buffer memory MT. The purpose of the unit UCA is to determine the output path of a frame as a function of the informations TC and DLI. The output stage ES is entrusted with transmitting a frame to the output path towards which it was relayed.

Figure 6:
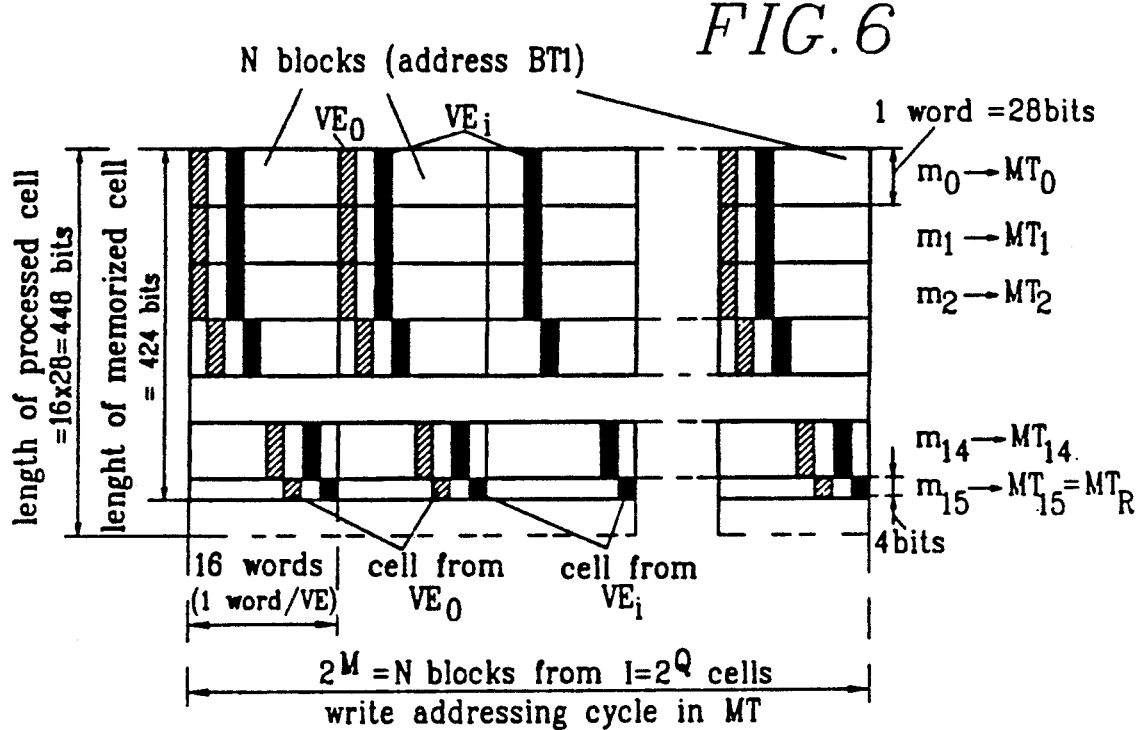
FIG. 6 schematically shows the distribution of frame cells memorized in the buffer memory of the switching relay.

From here on, we will consider that the number I of input paths and the number I of output paths will be equal to 16. This number could just as well be equal to a lower power of 2, e.g. 2, 4 or 8, without calling into question the organization of the frame switching relay; the sole consequence would be to reduce the time constraints. As previously stated, a cell comprises 53 octets; however, to simplify production of the relay, each cell is enlarged to 56 octets, thus enabling a cell to be considered to be comprised of $R=16$ words of 28 bits $m_0$ to $m_{15}$. As a result, the $(16 \times 28)-(6+47)8=24$ last bits in the last word $m_{15}$ are non-significant, and only the first four bits of this last word are significant, as shown in FIG. 6.

The time base BT conventionally comprises a local clock HL at a frequency that is integral multiple of the binary rate in the input and output paths. From this local clock and by means of frequency dividers, counters and simple logic circuits DCT, the time base derives numerous clock signals required for the various functions of the switching relay. These signals are main signals $H_0$ to $H_{Q+M-1}$ that define word addresses in the buffer memory MT, and secondary signals of greater frequency that notably control the writing and reading of words and parts of words.

Figure 7:
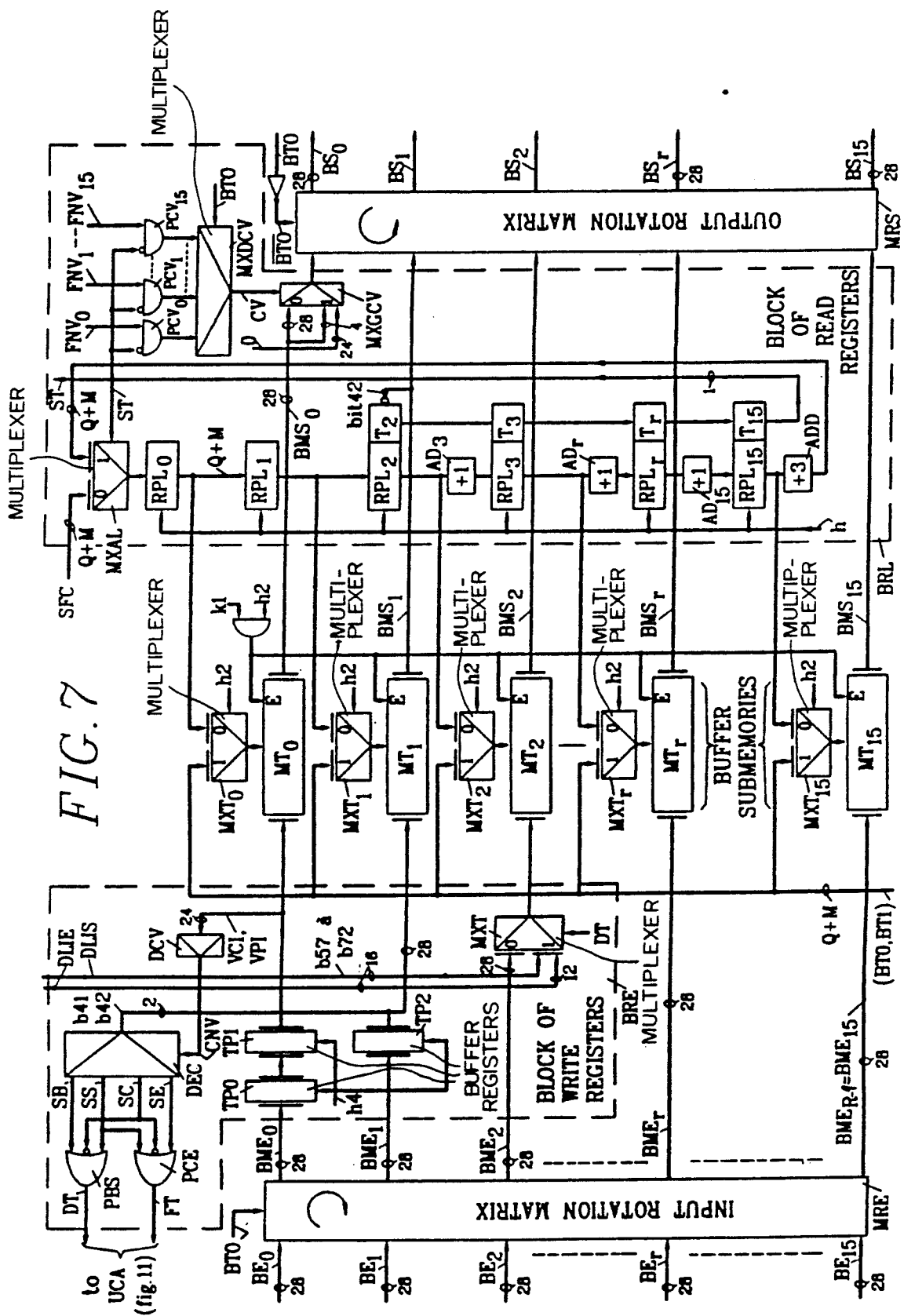
FIG. 7 is a detailed block-diagram of a block of write registers and of a block of read registers for the buffer memory included in the switching relay.

As shown in FIG. 7, the buffer memory MT is comprised of R=16 identical and independent submemories $MT_0$ to $MT_{15}$. A submemory $MT_r$, where r is an integer index lying between O and R−1=15, is intended to store the words $m_r$ having rank r in all the cells. Each word is applied in the form of 28 parallel bits to be written in the memory via a respective 28-wire bus $BME_r$, and likewise, is read in order to be transmitted in the form of 28 parallel bits in a respective 28-wire output bus $BMS_r$.

Figure 8:
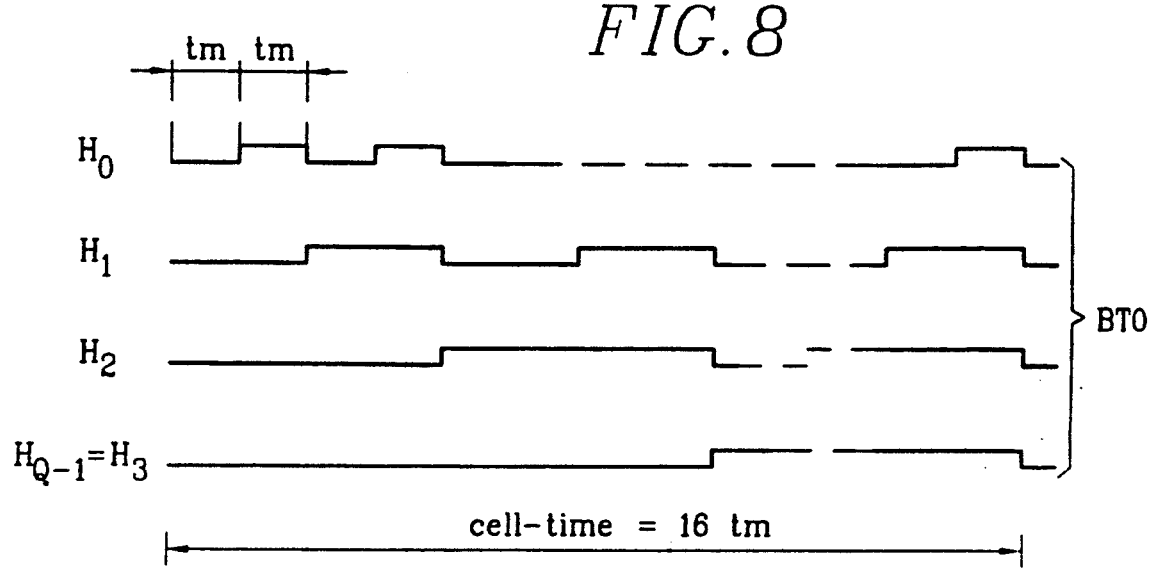
FIG. 8 is a time chart showing all the frame cell word address signals.

If $H_0$ is a clock signal of which the half-period defines a "word time" tm, i.e., the time interval occupied by a 28-bit word, it ensues that Q=4 clock signals in phase $H_0$, $H_1$, $H_2$, $H_{Q-1}=H_3$ with respective periods of 2 tm, 4 tm, 8 tm, $2^Q$ tm are necessary to write $I=2^Q=16$ words coming from the I paths $VE_0$ to $VE_{I-1}$ successively in each submemory, and as will be seen hereinafter, to write the R=16 words of a same cell respectively in the submemories $MT_0$ to $MT_{15}$. The signals $H_0$ to $H_3$, collectively called BT0, are shown in FIG. 8 and thus determine the addresses of the submemories as well as the addresses of the input paths $VE_0$ to $VE_{15}$ in each of the submemories.

According to the diagram in FIG. 6, the cells are stored obliquely in the submemories $MT_0$ to $MT_{15}$ in a substantially parallel and diagonal form called "paragonal", as disclosed in U.S. Pat. No. 4,603,416. Each submemory $MT_0$ to $MT_{15}$ thus contains N blocks of I=16 words of 28 parallel bits, where N defines the capacity of the buffer memory MT as a function of the average number of cells per frame and of the cell loss rate per input path, and consequently the capacity of the memory to store frames. In order to locate these N blocks, the time base BT derives M other clock signals $H_Q$ to $H_{Q+M-1}$ respectively having periods ($2^{Q+M}$ tm)=32 to ($2^{Q+M}$ tm) collectively referred to hereinafter as BT1. The signals BT0 and BT1 thus constitute the write address of a 28-bit word in a submemory $MT_r$.

Figure 9:
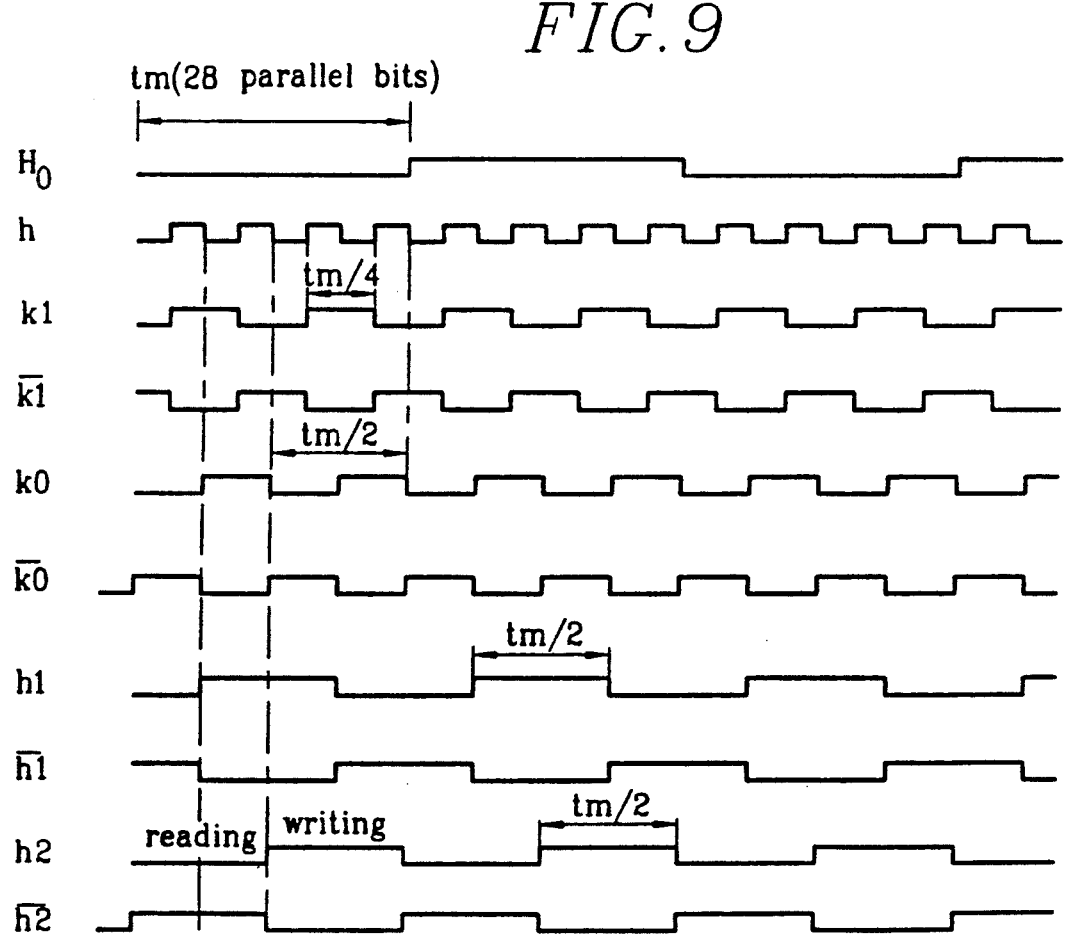
FIG. 9 is a time chart showing clock signals derived by a time base included in the switching relay.

As shown in FIG. 9, in dependence on a master clock signal h with a half-period equal to tm/8, the time base BT supplies clock signals k1 and k0 of period tm/4 respectively in phase with rising and falling edges of the signal h, clock signals h1 and h0 of half-period tm/2 respectively in phase with odd and even-ranked falling edges of the signal h, as well as signals $\overline{k1}$, $\overline{k0}$, $\overline{h1}$ and $\overline{h0}$ respectively complementar of the aforesaid signals.

In this way, each word time tm is comprised of two allotted times, one being allotted to reading in the buffer memory and corresponding to h2="0", and the other being allotted to writing and corresponding to h2="1". For each submemory $MT_r$, a multiplexer $MXT_r$ selects, under the control of the signal h2, the write or read address. More specifically, the signal k1.h2 controls writing.

Figure 14:
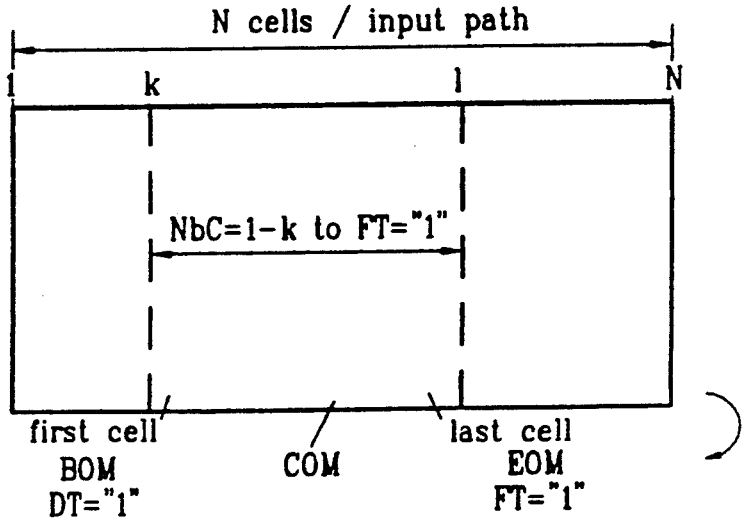
FIG. 14 is a diagram regarding the capacity of the buffer memory and illustrating a possibility of overwriting cells.
Figure 12:
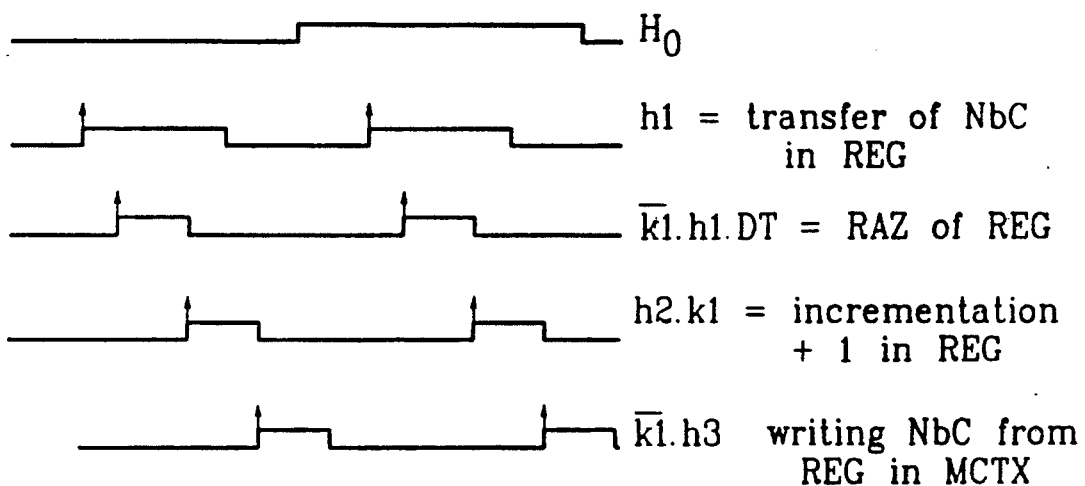
FIG. 12 is a time chart showing signals for updating memorized numbers of memorized cells in relation to frames being memorized in the buffer memory.
Figure 13:
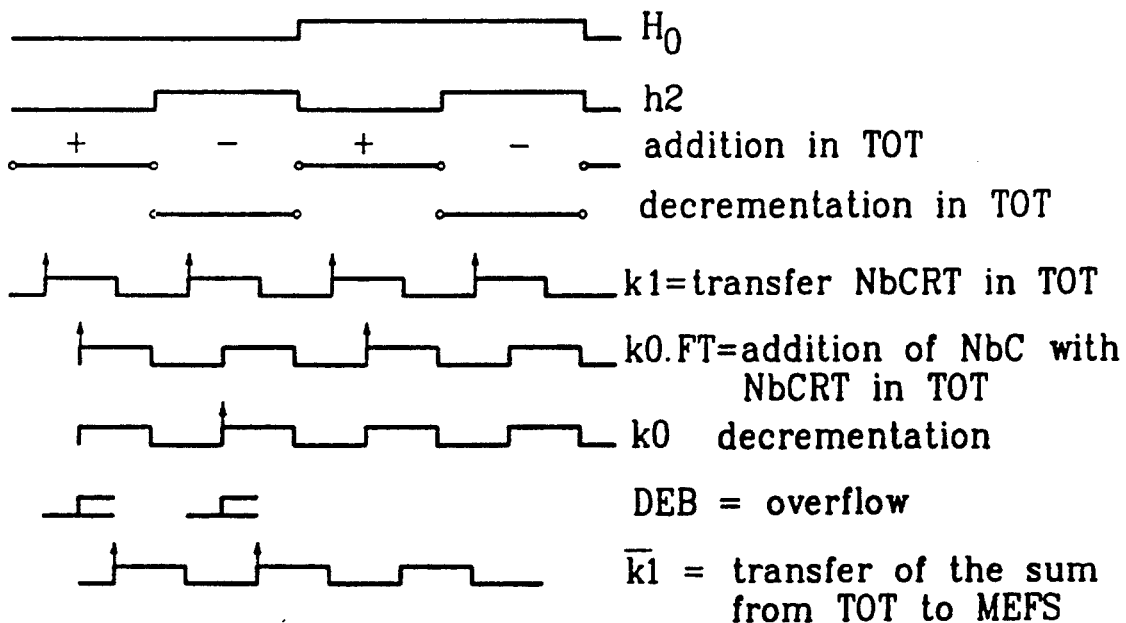
FIG. 13 is a time chart showing signals for the incrementation and decrementation of numbers of cells to be respectively retransmitted to output paths of the switching relay.

Other signals resulting from simple logic operations on the clock signals are also produced, as shown in FIGS. 12 to 14, and their purpose will be justified hereinunder.

As shown in FIGS. 5 to 7, the input stage EE comprises I=16 input interfaces $IE_0$ to $IE_{15}$ respectively linked to the paths $VE_0$ to $VE_{15}$, a circulator MRE and a block of write registers BRE.

The purpose of an input interface $IE_i$ is to ensure the synchronization of the start of the cell and the synchronization of the frame start as a function of the signals BT0, and the parallelling of the cells in the path $VE_i$ into words with 28 parallel bits in a bus $BE_i$.

The synchronization of the cell consists in detecting the start of a cell in the flow of serialized bits arriving in the input path $VE_i$. To do so, an 8-bit heading error control field HEC is used, the bits of field HEC corresponding to bits 33 to 40 (FIG. 4) contained in the heading of each cell. In principle, cell synchronization is declared acquired when the result of calculation of the syndrome on the 40 current bits of the heading is nil.

Frame synchronization consists in finding the start of a frame in the flow of serialized cells arriving in the path $VE_i$. We know the first cell of a frame has a code TC="10" for a BOM cells and TC="11" for an SSM cell. Searching for the frame start is performed from the code TC. When the start of a frame is detected, a calculation of the syndrome of the frame is triggered off. This calculation does not take either the cell headings or the adaptation fields TC +LG into account. Moreover, only the significant octets of an end-of-frame cell EOM or SSM, the number of which is indicated by the field LG, enter the calculation of the syndrome. At the end of the calculation, after the LG significant octets of an EOM or SSM cell, the frame synchronization is acquired when the result of the calculation is nil. Otherwise, an error is detected, e.g. subsequent to a transmission error, or to a cell loss or gain.

Each serialized cell in the path $VE_i$ is parallelled over 28 bits and memorized in a series-to-parallel converter and in a FIFO queue included in the interface $IE_i$. Every time a HEC word is detected, the information at the beginning of the cell in the form of a bit in a predetermined state $d_i$ is also memorized in the queue. If an error is detected during validation of the frame control sequence FCS included in the last two significant octets of the last EOM or SSM cell of the current frame, the last cell is not written in the queue. The absence of the last frame cell will be processed by the control and addressing unit UCA so as not to retransmit this frame.

Figure 10:
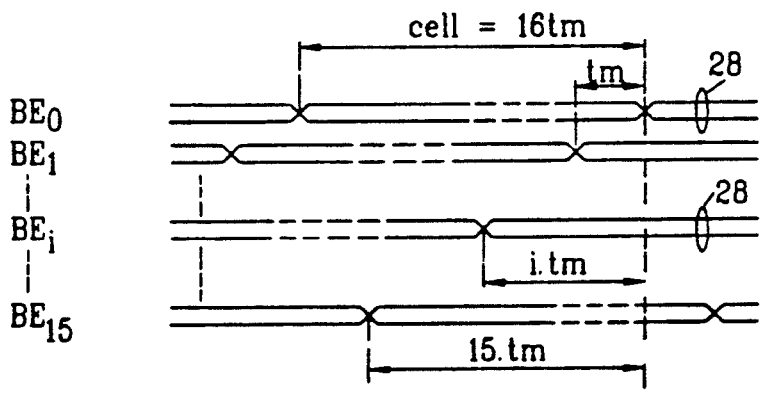
FIG. 10 schematically shows time shifts of one word time between synchronized cells coming from input paths and applied to an input rotation matrix included in the switching relay.

It thus appears that the functions of the input interfaces $IE_0$ to $IE_{15}$ are somewhat similar to those of the input circuits $CE_0$ to $CE_{15}$ described in U.S. Pat. No. 4,603,416, in order to synchronize together the cells and frames respectively in the input paths $VE_0$ to $VE_{15}$, and to create a time shift of one word time tm between them, as shown in FIG. 10. This time shift resulting from a parallel-to-diagonal conversion imposes that the words of the same rank $M_r$ in synchronous cells transmitted by the buses $BE_0$ to $BE_{15}$ be shifted by the word time tm from one another. The time shift is controlled by a switcher-demultiplexer AIG, of which the data input is in the state "1", and the selection inputs receive the addresses BT0 at the period tm to derive the I=16 logic signals respectively timing the reading of the FIFO queues in the interfaces $IE_0$ to $IE_{15}$.

In reference to FIG. 7, the buses $BE_0$ to $BE_{15}$ having 28 wires respectively link the outputs of the FIFO queues in the interfaces $IE_0$ to $IE_{15}$ to input ports of the MRE circulator which is a rotation matrix. This matrix multiplexes the words with 28 parallel bits of same rank $m_0$ to $m_{15}$ in the time-shifted synchronous cells, in the buses $BME_0$ to $BME_{15}$. If r designates the rank of a word in a cell and i the rank in the input path $VE_i$ and of the bus $BE_i$, where i and r are integers lying between 0 and 15, the word $m_r$ of a cell transmitted by the bus $BE_i$ exits the matrix MRE via the bus $BME_r$ at the same time as the word $m_i$ of rank i of a cell having been transmitted by the bus $BE_r$ exits via the bus $BME_i$, and as the word $m_O$ of rank of a cell having been transmitted by the bus $BE_{i+r}$ exits via the bus $BME_0$. In particular, it should be noted that the 24-bit asynchronous time-division link field $VPI+VCI$ is transmitted by the first bus $BME_0$, the 2-bit cell-type field TC is transmitted by the second bus $BME_1$, and the 3-octet link identification field DLI is transmitted by the third bus $BME_2$.

In the absence of the write register block BRE, 16 words of different rank and from different cells are written at each word time in the buffer memory, at the address indicated by the couple (BT0, BT1).

With regard to a given cell at output of the input matrix MRE, the word $m_O$ of the cell is situated in the bus $BME_0$ at the time $tm_O$, and the word $m_r$ is situated in the bus $BME_r$ at the time $tm_r$. The informations required for the processing of a frame are situated in the words $m_1$ and $m_2$ of a cell which are then respectively delayed by two word times in series-connected registers TP0 and TP1 and by one word time in a register TP2. These three registers each have 28 parallel stages and receive the clock signal h2. At the third word time ensue:

The 24 bits in the words VPI and VCI at the output of the register TP1 are decoded by an empty cell detector DCV in the form of an OR-circuit for determining whether the cell is empty, in which case the processing of the cell is disarmed, by applying a signal CNV = "0" at an enabling input of a 2-bit decoder DEC.

The two bits of the cell-type word TC, ranked 41 and 42 in the cell, are transmitted by the register TP2 and are decoded by the decoder DEC into a signal "1" on one of four outputs SB, SS, SC and SE of the decoder DEC, corresponding to the cells BOM, SSM, COM and EOM when the decoder DEC is activated by CNV = "1"; the outputs SB and SS of the decoder DEC are connected to the inputs of an OR-gate PBS which supplies a signal DT in the state "1" for signalling a beginning of frame, and the outputs SS and SE of the decoder DEC are connected to two inputs of an OR-gate PCE, which supplies a signal FT in the state "1" for signalling an end of frame; the output SC of the decoder DEC is connected to inverse inputs of the gates PBS and PCE.

The new word $m_2$ of the cell is determined: if we suppose that the first two octets DLIE of the field DLI are used, the octets DLIE are transmitted to a translation memory MTA (FIG. 5) which either replaces them by a new value DLIS when the cell is of the "first" BOM or SSM type, or leaves the octets unchanged when the cell is not of the "first" type. These latter operations are carried out by a multiplexer MXT of which the first inputs are connected to the bus $BME_2$ and the second inputs are connected to sixteen outputs DLIS of the memory MTA as well as to the last twelve wires of the bus $BME_2$; these first and second inputs are selected by the start of frame signal DT.

The three words $m_0$, $m_1$ and $m_2$ of the same given cell are then written in submemories $MT_0$, $MT_1$ and $MT_2$ at the address given by the current value of (BT0, BT1). At the following word time, the word $m_3$ of said cell is written in the submemory $MT_3$ at the address (BT0, BT1)+1 (mod 16N), etc. The cell is stored in the buffer memory as indicated in FIG. 6.

The schematic organization of the controlling and addressing unit UCA is indicated in FIG. 5. The functional and essential members of this unit UCA are the translation and routing memory MTA, a context memory MCTX, output path address queues $FS_0$ and $FS_{15}$ and an output queue state checking circuit CEFS.

The translation and routing memory MTA shown in FIG. 5 is a memory RAM containing (16.2 Y) link words DLIS. The integer y is less than $(8-1) \times 2 = 14$ and designates the number of useful bits in a word DLIE transmitted in the bus $BME_2$, as shown in FIG. 4. To each word DLIE determining a write address in combination with the address BT0 of the input path $VE_0$ to $VE_{15}$ at each word time tm, corresponds a new 16-bit link word DLIS read in the memory MTA and associated with a 4-bit number NVS of the output path $VS_0$ to $VS_{15}$ that must be taken by the frame in which the current cell is included. The new word DLIS is applied at the second inputs of the multiplexer MXT in order to be written in the submemory MT2, and the number NVS is supplied to a first "column" of the context memory MCTX.

The translation and routing memory MTA is updated by control processor PCC when a link is being set up.

The context memory MCTX contains sixteen triplets determining sixteen contexts respectively associated with the frames being processed received by the sixteen input paths $VE_0$ to $VE_{15}$, and cyclically addressed by the words BT0.

Figure 11:
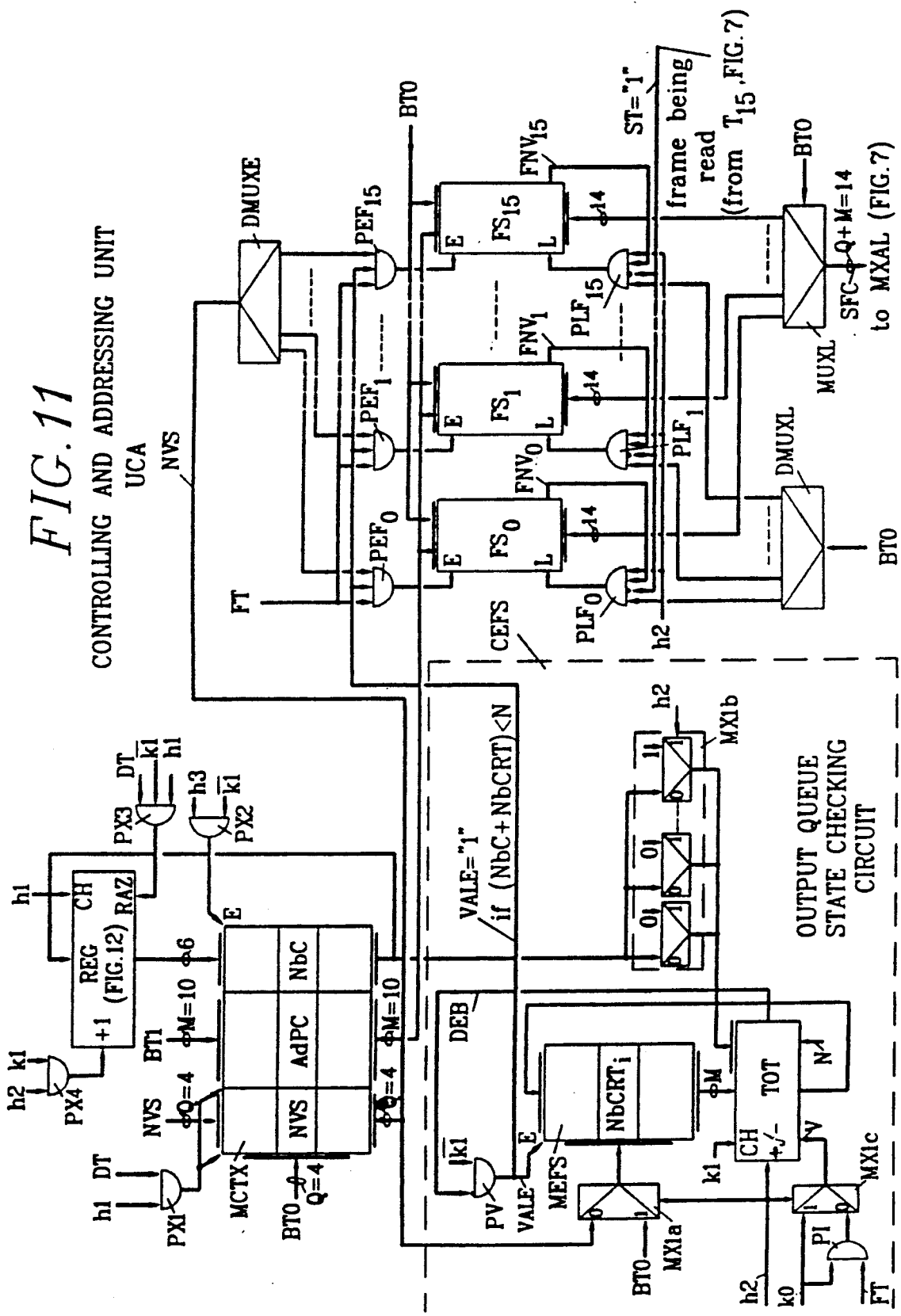
FIG. 11 is a detailed block-diagram of a controlling and addressing unit included in the switching relay.

In this way, to each frame being received, as shown in FIG. 11, corresponds a context including the 4-bit output path number NVS read in the memory MTA, the address AdPC of the block in the submemory $MT_0$ in which the first cell of the frame is written, and the number NbC of cells of the frame written in the buffer memory MT. Let us suppose, as an example according to the embodiment illustrated in FIGS. 6 and 11, that the buffer memory has a capacity of $2^M = 2^{10}$ cells per input path, which leads to write address words AdPC deduced from the 10 bits of BT1, and that the maximum number NC of cells in a frame is equal to $2^6 = 64 < 2^M$, i.e., 6 bits for coding the number NbC. The first two columns in the memory MCTX assigned to the numbers NVS and the addresses AdPC are write controlled (E) at the start of the frames by a signal DT.h1 fed by a two-input AND-gate PX1. The third column of the memory MCTX assigned to the numbers NbC is write controlled by another logic signal $\overline{k1}$.h3 via a two-input AND-gate PX2.

The number NbC is updated by means of an incrementation register REG with 6 parallel bits which increments by one unity the number NbC read in response to a cell of the frame being received. The register REG has a resetting input RAZ controlled by the signal DT.$\overline{k1}$h1 via a three-input AND-gate PX3, a +1 incrementation input controlled by a signal h2.k1 via a two-input AND-gate PX4, and a load input CH receiving the signal h1.

R = 16 output FIFO queues $FS_0$ to $FS_{15}$ are respectively associated with the output paths $VS_0$ to $VS_{15}$. An output queue $FS_i$ memorizes the 10-bit addresses AdPC of first cells of frames which have been completely written in the buffer memory and which are destined for the path $VS_i$ and which are not completely read. The queues $FS_0$ to $FS_{15}$ have data input buses connected to the 10 outputs of the second column AdPC in the context memory MCTX, and to the 4 outputs BT0 of the time base. 14-wire output buses of the queues $FS_0$ to $FS_{15}$ are connected to a read address multiplexer MUXL having a 14-wire output bus SFC, and are cyclically selected by the words BTO in the multiplexer MUXL.

The queues $FS_0$ to $FS_{15}$ are write controlled (E) by a demultiplexer DMUXE receiving 4-bit words NVS read in the first column in the memory MCTX, and by $I=16$ three-input AND-gates $PEF_0$ to $PEF_{15}$ having first inputs respectively connected to I outputs of the demultiplexer DMUXE. Second inputs of the gates $PEF_0$ to $PEF_{15}$ receive the end-of-frame signal FT. Third inputs of the gates $PEF_0$ to $PEF_{15}$ receive a write enabling signal VALE from the checking circuit CEFS.

The addresses AdPC+BT0 read in the queues $FS_0$ to $FS_{15}$ are multiplexed in a multiplexer MUXL. The reading of the queues is controlled by $I=16$ four-input AND-gates $PLF_0$ to $PLF_{15}$ having first direct inputs respectively connected to the I outputs of a demultiplexer DMUXL. Second inverse inputs of the gates $PLF_0$ to $PLF_{15}$ receive a frame signal ST which is in the state "1" while a frame is being read during the cyclic word time corresponding to the associated queue and path. Outputs of the queues $FS_0$ to $FS_{15}$ apply to third direct inputs of the gates $PLF_0$ to $PLF_{15}$ signals $FNV_0$ to $FNV_{15}$ which each are in the state "1" as long as the associated queue is not empty and therefore contains at least one first cell address. Finally, fourth direct inputs of the gates $PLF_0$ to $PLF_{15}$ receive the logic signal h2 in order to read one of the queues $FS_0$ to $FS_{15}$ during a write operation in the buffer memory.

The output queue state checking circuit CEFS contains a memory MEFS storing $I=16$ numbers $NbCRT_0$ to $NbCRT_{15}$ of cells to be retransmitted respectively to the output paths $VS_0$ to $VS_{15}$ and therefore numbers associated with the output queues $FS_0$ to $FS_{15}$. Like the addresses BT1, the numbers $NbCRT_0$ to $NbCRT_{15}$ are limited by the number of cells that can be written in the buffer memory MT and coming from a same input path, and are therefore limited to $N=2^M=2^{10}$. The memory MEFS is alternatively addressed, during a word time tm, by the current path number NVS read in the memory MCTX, in response to h2="0", and by the input path number BT0, in response to h2="1", via a multiplexer MX1a.

The circuit CEFS also comprises a totalizing register TOT having $M=10$ first data inputs connected to the data output bus of the memory MEFS, and six second data inputs connected to the output bus of the third column NbC of the context memory MCTX, via first inputs of a multiplexer MX1b. Six second inputs of the multiplexer MX1b are set in the states "000001" representative of the FIG. 1. Selection inputs of the multiplexers MX1a and MX1b and of a third multiplexer MX1c in the circuit CEFS, and an incrementation (+)/decrementation (−) control input of the register TOT receive the signal h2. The incrementation or decrementation selected in the register TOT is enabled by a state "1" at an input V of this register which is connected to an output of the multiplexer MX1c. The inputs of the multiplexer MX1c receive the signal k0 and, via a two-input incrementation enabling AND-gate PI, the signal (k0.FT). The 10-wire output bus of the totalizing register TOT is connected to the data inputs of the memory MEFS. In this memory, writing is controlled by the enabling signal VALE=$\overline{DEB}$kI supplied by an AND-gate PV, where DEB designates an overflow signal which is supplied by the register TOT. The signal DEB is in the state "1" when the result of the operation, in fact an incrementation, carried out in the register TOT, is greater than the maximum number N of cells per input path that the buffer memory MT can store.

The general operating principle of the controlling and addressing unit UCA is as follows, in reference to FIGS. 7 and 11.

At each word time tm, the unit UCA receives the cell type signals DT and FT and the identifier bits DLIE of the cell received by the buses $BME_1$ and $BME_2$. The 14 significant bits among the 24 identifier bits are interpreted as the identification field DLIE of a frame if the field TC has a BOM or SSM value, i.e., if DT="1" and FT="0".

If TC=BOM or SSM, and therefore DT="1" and FT="0", DLIE is translated to DLIS which determines the number of the output path; a context (NVS+AdPC+NbC) associated with the frame is created.

If TC=COM, and therefore DT=FT="0", the context, and particularly the number NbC, is updated.

If TC=EOM or SSM, and therefore DT="0" and FT="1", all the cells of the frame have been received; the unit UCA decides whether the frame can be retransmitted as a function of its context and of the busy state of the destination output path.

These operations are now described in detail. At each word time tm, the value of BT0 indicates the number of the input path which is taken into account in the unit UCA.

The translation and routing memory MTA (FIG. 5) is addressed at each word time tm by the couple (BT0, DLIE) to supply to the multiplexer MXT (FIG. 7) the value of the new word DLIS which will be included in the frame at output of the frame switching relay, and the number of the output path NVS to which the frame is to be retransmitted. The new word DLIS is written in the buffer submemory $MT_2$ (FIG. 7).

As previously stated, a context is associated with each frame being received. The value BT0 addresses the current context in the memory MCTX. Each context contains the address of the first cell of the frame AdPC in the buffer memory, the number NbC of cells of this frame already received, and the number NVS of the output path to which the frame is to be retransmitted.

If the current cell is a first cell of a frame BOM or SSM, i.e., DT="1", a new context is created by writing (E) NVS at the value NVS read in the memory MTA and AdPC at the value of BT1, in response to the signal DT.h1, then the number NbC at 1, in response to the signal $\overline{kI}$.h3. The complete address of a cell in the buffer memory is, in fact, the couple comprising the input path number BT0 and the number BT1 of the buffer memory block (FIG. 6). However, there is no need to memorize BT0 as this information is already contained in the rank of the context address in the memory MCTX.

The load signal for NbC, the resetting signal for register REG, the incrementation signal, and the signal to transfer NbC in the memory MCTX in relation to the register REG are shown in FIG. 12. If the cell being written is an intermediary cell COM or a true last cell EOM, i.e., DT="0", the number of cells NbC is incremented one unity via the +1 input of the register REG. The updating of the number NbC by means of the register REG is carried out in four steps, as illustrated in FIG. 12:

1) loading of the register REG with the value of NbC in response to the address of the corresponding path [BT0];

2) resetting (RAZ) of the register REG if the incident cell is of the BOM or SSM type, i.e., DT="1";
3) incrementation of the register REG, in response to h2.k1;
4) transfer of the contents of the register REG for writing in the third column of the memory MCTX.

If the current cell is a last cell of a frame EOM or SSM, i.e., FT="1", the unit UCA must decide whether this frame can be transmitted in the corresponding output path NVS. This decision is based on the value of the count NbC of the frame and on the count NbCRT of the output path of index NVS. A detailed account will be provided hereinunder of the evolution of the count NbCRT which indicates at all times the number of cells that must be transmitted to the output path NVS and which therefore belonged to frames for which the transmission decision has been taken.

It should be recalled that management of the buffer memory MT is not optimized, as the write addresses BT0 are cyclic. To each input path $VE_0$ to $VE_{15}$ corresponds a capacity of $2^{10}=N$ locations in the buffer memory. These locations are cyclically write managed in such a way that a cell arriving on the input path $VE_i$ and memorized at the address k in the buffer memory will be overwritten N cell times, i.e., N(16.tm) later by a cell arriving via the same input path $VE_i$; in fact, the address k is the address of a word of given rank in the cell, preferably the address of the first word $m_0$. A cell can thus wait a maximum of N cell times in the memory MT before being retransmitted. As a frame is comprised of several cells, the overwriting prevention mechanism must know how long the first cell of each frame can stay in the buffer memory. FIG. 14 illustrates this problem.

The first cell of a frame having (1−k) cells and arriving on the input path $VE_i$ is memorized at the address k. The last cell of the frame is memorized at the address 1. The count NbC associated with the frame, which indicates the number of cells received of that frame, also indicates the length of stay, expressed in cell times, of the first cell of the frame in the buffer memory until the frame is completely memorized. This first cell will therefore be overwritten after $[X=N-(1-k) \bmod N]$ cell times after the last cell has been memorized. As will be seen hereinafter, the checking circuit CEFS only decides to retransmit the frame if less than X cells must be previously transmitted on the same output path $VS_i$, therefore if NbC−NbCRT<N. The memory overflow signal DEB is given in the state "1" when the frame cannot be transmitted; in this case, the write enabling signal VALE is "0", and the address AdPC of the frame is not written in the queue $FS_i$ (FIG. 11).

To each output path corresponds an output queue. This queue memorizes the addresses of the first cells of the frames to be transmitted in the output path. The operating of the unit UCA ensures that a frame, of which the address is stored in an output queue, will be transmitted without risking being overwritten. The writing and reading of address AdPC in the queues occur as follows. The 16 words BT0 successively supplied by the time base serve as addresses for the context memory MCTX, in relation with the input path, and consequently as complements of the addresses AdPC written in the respective queues.

At each word time BT0, if the cell received is a last cell of a frame EOM or SSM indicated by FT="1" at the second inputs of the AND-gates $PEF_0$ to $PEF_{15}$ and if the circuit CEFS enables the transmission of the corresponding frame by DEB="0", the corresponding gate $PEF_i[BT0]$ is open, and the first cell address AdPC[BT0] read in the context memory is written in the queue $FS_i$ of which the index i is equal in binary code to NVS[BT0].

For reading, the 16 queues are also cyclically considered, one per word time. The queue address word BT0, decoded by the demultiplexer DMUXL, enables one of the gates $PLF_i$. The current queue $FS_i$ is read if it is not empty, i.e., $FNV_i$="1", and if the previous frame has been completely retransmitted in the associated output path $VS_i$, i.e., ST="0".

The 14-bit word SFC=[AdPC, BT0] read in the queue $FS_i$ is then applied by the multiplexer MUXL to first inputs of a read address multiplexer MXAL included in a read register block BRL of output stage ES (FIGS. 5 and 7).

The operating of the queue state checking circuit CEFS is described hereinunder. Each word $NbCRT_i$ indicates the number of cells to be retransmitted in the output path $VS_i$. As shown in FIG. 13, each word time tm is divided into two half-periods defined by the signal h2 and allotted one to the incrementation and the other to the decrementation of the number $NbCRT_i$, respectively for h2="0" and h2="1". The multiplexers MX1a, MX1b and MX1c select the inputs to be taken into account, as a function of the state of the logic signal h2.

The number $NbCRT_i$ is incremented in response to a last cell EOM or SSM of a frame to be retransmitted to the output path, signaled by FT="1" at input of the gate PI and indicated by the address NVS[BT0] for reading, via the multiplexer MX1a (h2="0"), the number $NbCRT_i$ associated with the output NVS. In the totalizing register TOT, $NbCRT_i$ and NbC[BT0] are added together, and the sum is compared with the maximum number of cells N. If the sum of the numbers $NbCRT_i$ and NbC[BT0] is greater than N, the frame is abandoned; this overflow is translated by DEB="1" at output of the register TOT, and VALE="0" at output of the gate PV, which maintains closed the AND-gate $PEF_i$ corresponding to i=NVS[BT0] and, as a result, the address AdPC[BT0] is not written in the corresponding queue $FS_i$, and the frame is abandoned. In the opposite case, the gate PV is open, the sum of $NbC+NbCRT_i$ is written as a new value of $NbCRT_i$ in the memory MEFS, and the address AdPC is written in the queue $FS_i$.

The number $NbCRT_i$ is decremented by 1 each time the output queue $FS_i$ becomes the current queue, i.e., h2="1" on the multiplexer MX1a, considering that a cell has been transmitted in response to the corresponding word [BT0]$_i$. This decrementation only takes place as long as the number $NbCRT_i$ is greater than 0.

During the decrementation phase, h2="1", the number $NbCRT_i$ is selected by the BT0 value corresponding to the current output queue $FS_i$, via the multiplexer MX1a, considering that a cell has been transmitted by the corresponding word [BT0]$_i$. The one-unity decrementation is enabled in the multiplexer MX1c, in order for the multiplexer MX1b to apply "000001" to the second data inputs of the register TOT. The decremented value ($NbCRT_i$-1) is then written in the memory MEFS in response to the write enabling signal VALE="1".

In reference to FIG. 7, the output stage ES comprises the block of read registers of the buffer memory BRL, a circulator MRS and output interfaces $IRS_0$ to $IRS_{15}$.

The read register block BRL, which is shown in detail in FIG. 7, is provided for supplying the read addresses of the cells to be transmitted to the buffer submemories $MT_0$ to $MT_{15}$, and more precisely, the successive addresses of the R=16 words $m_0$ to $m_{15}$ of each of the cells to be transmitted respectively to second inputs of the multiplexers $MXT_0$ to $MXT_{15}$ connected to the buffer submemory addressing inputs $MT_0$ to $MT_{15}$. The block BRL comprises R=16 read buffer registers $RPL_0$ to $RPL_{15}$ connected in cascade and of which the M+Q=14-wire output buses are respectively connected to the second inputs of the multiplexers $MXT_0$ to $MXT_{15}$. One-stage buffer registers $T_2$ to $T_{15}$ are cascade-connected and are respectively allocated to the registers $RPL_2$ to $RPL_{15}$. An inverse input of the first register $T_2$ is connected to the second wire of the output bus $BMS_1$ of the second buffer submemory $MT_1$ which carries the bit $b_{42}$ of the sub-field TC indicating in the state "1" an "end-of-frame" cell EOM or SSM (FIG. 4). The last register $T_{15}$ thus derives the signal ST applied to a selection input of the multiplexer MXAL and at the second inverse inputs of the gates $PLF_0$ to $PLF_{15}$ (FIG. 11).

The input bus of the first register $RPL_0$ is connected to the outputs of the multiplexer MXAL, and the input bus of the registers $RPL_1$ and $RPL_2$ are directly connected to outputs of the previous registers $RPL_0$ and $RPL_1$ respectively, since the words $m_0$, $m_1$ and $m_2$ of a cell have been written simultaneously with a same write address (BT0, BT1) in the submemories $MT_0$, $MT_1$ and $MT_2$ thanks to the buffer registers TP0, TP1 and TP2. The input buses of the other read registers $RPL_3$ to $RPL_{15}$ are connected to the outputs of the previous registers $RPL_2$ to $RPL_{14}$ via one-unity adders $AD_3$ to $AD_{15}$, respectively. The output bus of the last read register $RPL_{15}$ is connected to second inputs of the multiplexer MXAL via a figure-three adder ADD. Under these conditions, after 16 word times succeeding to the inscription of the address of the first word $m_0$ of a cell in the register $RPL_0$ and timed by the clock signal h2 applied to the registers $RPL_0$ to $RPL_{15}$, the address of the first word of a second cell following the previous cell in the same frame is applied to the register $RPL_0$ via the multiplexer MXAL. Indeed, it should be remembered that the storing of the cells in the buffer memory MT is not optimized and that two consecutive cells in a same frame therefore have addresses a and b such that:

$$b = a + 16 \text{ modulo } (16.N)$$

As the words of a cell are stored is a substantially diagonal fashion in the buffer memory, as shown in FIG. 6, the address of the first three words of a cell is equal to the address of the last word of the previous cell coming from the same input path, increased by the figure three. In the 28-wire output buses $BMS_0$ to $BMS_{15}$ of the submemories $MT_0$ to $MT_{15}$, the words $m_0$ to $m_{15}$ of a cell are thus all successively transmitted in diagonal form. As a result, at each word time the block BRL reads 16 words of different rank, respectively in 16 different cells, destined for 16 different output paths.

Let us now consider the transmission of a particular cell. At a first word time, the register $RPL_0$ contains the address of the first word $m_0$ of the cell; at the following word time, this address is transferred to the register $RPL_1$ and constitutes the address of the second word $m_1$. To take the temporary diagonal storage of a cell in the memory into account, during the address transfer from the register $RPL_2$ to the register $RPL_3$, and then from the register $RPL_r$ to the register $RPL_{r+1}$, up to the register $RPL_{15}$, the address is incremented by one unity. It will be noted that the adder ADD gives the address of the first word of the following cell coming from the same input path.

The reading and transmission process of a frame to a destination output path $VS_i$ is as follows.

Subsequent to the reading of the output queue $FS_i$, the outputs SFC of the multiplexer MUXL supplies the address of the first word $m_0$ of the first cell of the frame to be transmitted; ST being equal to "0", this address is loaded in the register $RPL_0$ to read the word $m_0$ of the cell. Then at each of the following 15 word times, the same address is transferred from one read register to the next to enable the following 15 words of the cell to be read.

During reading of the second word in the submemory $MT_1$, the bit $b_{42}$ is memorized in the register $T_2$. The states "1" and "0" of this bit indicate whether or not the cell is the last one of the frame. The bit is propagated at each word time from the register $T_i$ to the register $T_{i+1}$, up to the register $T_{15}$. When a new cell is to be transmitted on the output path $VS_i$, there are two possible cases.

1) The cell that has just been transmitted was the last one in the frame, i.e., ST="0". The gate $PLF_i$ (FIG. 11) is open to read the queue $FS_i$, and therefore to transmit the following frame to the output path $VS_i$. The first inputs of the multiplexer MXAL are selected to transfer the address of the first cell of the following frame from the queue $FS_i$ to the register $RPL_0$.

2) The cell that has just been transmitted is not the last one of the frame, i.e., ST="1". The gate $PLF_i$ remains closed and the second inputs of the multiplexer MXAL are selected to load the register $RPL_0$ with the address transmitted by the adder ADD. The following cell of the frame, of which the address is produced by the adder ADD, is then read in the buffer memory.

If the output queue $FS_i$ is empty, i.e., $FNV_i$="0", when a new frame is due to be transmitted in the output path $VS_i$, the value of the address loaded in the register $RPL_0$ is not significant; nevertheless, the buffer memory MT reading process is carried out in the same way. In this case, bits 5 to 28 of the word read in the submemory $MT_0$, which correspond to the fields VPI and VCI of the heading of a cell (FIG. 4), are set to "0", causing the transmitted cell to be deemed an empty cell.

For this purpose is provided an empty cell generating multiplexer MXGCV of which 28 first inputs are connected to the bus $BMS_0$ of the submemory $MT_0$. In a group of 28 second inputs of the multiplexer MXGCV, four are connected to the first wires of the bus $BMS_0$ corresponding to bits 1 to 4 of a word $m_0$, and the 24 other inputs are set at "0". These two groups of inputs are selected by the output CV of an empty cell signalling multiplexer MXCDV having sixteen inputs connected to outputs of two-input AND-gates $PCV_0$ to $PCV_{15}$ and selected by the word BT0. A gate $PCV_i$ has an inverse input receiving the signal ST and a direct input receiving the signal $FNV_i$. In this way, for each output path $VS_i$, the multiplexer MXGCV is controlled by the signal CV which indicates that a new frame must be transmitted on the output path of index i=BT0 when ST="0", as well as the empty state of the output queue $FS_i$.

The output circulator MRS is a rotation matrix similar to the circulator MRE. The first input port and the fourteen other input ports of the circulator MRS are respectively connected to the output bus of the multiplexer MXGCV and to the buses $BMS_1$ to $BMS_{15}$.

At each word time, sixteen 28-bit words $m_0$ to $m_{15}$ are present at the input of the output rotation matrix MRS. These 16 words belong to 16 different cells, are of different ranks and are destined for different output paths. The purpose of the output rotation matrix MRS is to present each word in the 28-parallel-wire output path $BS_i$ in front of the destination output interface $IS_i$ though which said word will be transmitted. During 16 successive word times, the 16 words of a cell are redirected to the same destination output path. This 16-tm cycle depends on the addresses $\overline{BT0}$ complementar to the addresses BT0.

The purpose of an output interface ISi is to recalculate the frame control sequence FCS of a frame to be transmitted, to generate an empty cell in the event of there being no frame to transmit, and finally to ensure adaptation to the transmission medium constituting the output path $VS_i$.

As the frame has been modified in the frame switching relay, by translation of field DLIE into field DLIS in the memory MTA (FIG. 5) and via the multiplexer MXT (FIG. 7), it is necessary to recalculate the sequence FCS before retransmitting the frame. The calculation is triggered off at the start of the frame, i.e., at the start of a first cell BOM or SSM, and is stopped at the end of the last cell EOM or SSM, using only the LG-2 first significant octets of the segment for the calculation.

In the multiplexer MXGCV of the block BRL (FIG. 7), the fields VPI and VCI of the cell heading are set to "0" if the output queue $FS_i$ is empty. The interface $IS_i$ detects this heading having the last 24 bits of the first word $m_0$ at "0" in order to generate an empty cell.

In the embodiment described above, it was presupposed that the frame switching relay is included in an asynchronous time-division network RTA; the input paths $VE_0$ to $VE_{15}$ and the output paths $VS_0$ to $VS_{15}$ are asynchronous time-division multiplex paths in which the frames are transmitted in the form of successive cells.

However, the frame relay that has been described can also be used in an asynchronous non-time-division network ANTN. The frames, transmitted in input and output paths, are preceded and followed by a flag of standardized binary configuration "01111110". Two successive frames are separated by one or several flags. To ensure that no 8-bit series in the frame imitates a flag, the terminal transmitting the frames inserts a bit "0" after five consecutive bits "0" in a frame; conversely, a terminal receiving frames suppresses every bit "0" following 5 consecutive bits "1" in a frame. Only the interfaces $IE_0$ to $IE_{15}$ and $IS_0$ to $IS_{15}$ need adapting to this new environment.

Frames are synchronized, divided into cells and parallelled by an input interface for a network ANTN. Parallelling is similar to that carried out in an interface $IE_i$ for an asynchronous time-division network and described previously.

Frame synchronization consists firstly in finding the start of a frame in the flow of bits arriving via an input path. As soon as a flag is recognized, all binary elements "0" following 5 consecutive binary elements "1" are suppressed, and calculation of the frame syndrome is triggered off. Upon reception of the end-of-frame flag, the result of the calculation should be nil.

As it is received, each frame is divided into cells. This dividing into cells is in keeping with the process already described; the fields TC and LG of the cell heading are created.

An output interface for a network ANTN recalculates the sequence FCS for each frame and retransmits it in the network. The calculation of the sequence FCS is similar to that carried out in an interface $IS_i$ in an asynchronous time-division network.

During retransmission of a frame, the 47 significant octets in each cell BOM, COM and the LG significant octets in each cell EOM, SSM are only retransmitted in the path $VS_i$. A binary element "0" is inserted after every series of 5 consecutive binary elements "1" to ensure that a flag is not simulated inside the frame. At least one separation flag is transmitted between two consecutive frames, it is most often necessary to introduce more than one inter-frame flag. In fact:

1) As neither the cell heading octets, the adaptation octet (TC+LG), or the filling octets numbering 3=50−47 according to the previous embodiment are retransmitted in an output path, it is necessary to have a buffer register in the output interface to enable retransmission of a frame to only begin when a sufficient quantity of information is available so as not to provoke a frame "breakage". During this waiting period, additional flags are transmitted.

2) Likewise, in the event of there being no frames to be transmitted, such absence being signalled by empty cells coming from output circulator MRS, inter-frame flags are transmitted.

What we claim is:

1. A switching relay in an asynchronous digital network for switching frames between input paths and output paths, each of said frames made up of one or plural successive cells each having a predetermined number of words, and a first cell in a frame comprising a path identifier, said switching relay comprising:
an input stage for detecting the frame cells received by said input paths so as to multiplex detected cells into multiplexed cells as a function of word ranks of words in said frame cells,
a cyclically write addressed buffer memory for memorizing said multiplexed cells,
a translation memory for replacing said path identifier by a new identifier and for associating a destination output path address with said new identifier,
plural read addressing means respectively associated with said output paths for each memorizing addresses relating to cells memorized in said buffer memory and destined for the associated output path,
an output stage for demultiplexing the cells read in said buffer memory under control of said plural read addressing means, into demultiplexed cells forming frames transmitted to said output paths,
a context memory for memorizing, for each input path, the address of the first cell in relation to a frame received by said each input path and being written in said buffer memory, and simultaneously the destination output path address supplied by said translation memory, in response to a first cell detected in said frame, means for memorizing cell numbers of memorized cells in relation to the memorized cells from frames being written and received respectively by said input paths, each of said memorized cell numbers being reset at the beginning of a frame received by an associated input path and being incremented by one in response to the memorizing of a cell contained in said frame, a control memory for memorizing numbers of cells to be retransmitted respectively in said output paths and contained in frames having been completely written in said buffer memory, and means for incrementing and decrementing said numbers of cells to be retransmitted, a number of cells to be retransmitted associated with an output path being incremented with the memorized cell number in relation to memorized cells contained in a frame being memorized and destined for said output path in response to the last cell of said frame, in order to compare a sum of said number of cells to be retransmitted and said memorized cell number with a capacity of said buffer memory in relation to the cells per input path, to write the address of said first cell of each frame in said write addressing means associated with said output path when said sum is less than said capacity and to decrement by one said number of cells to be retransmitted in response to each cell of said frame read in said buffer memory.

2. A switching relay as claimed in claim 1, comprising means for detecting in each of said multiplexed cells a cell type word thereby deriving a start-of-frame signal in response to a first cell in a frame containing several cells or in response to a cell comprising a complete frame, and an end-of-frame signal in response to a last cell in a frame containing several cells or in response to a cell containing a complete frame, for each input path, the respective start-of-frame signal controlling the writing of said destination output path address and said address of said first frame cell in said context memory, as well as the resetting of said frame cell number, and for each output path, said end-of-frame signal controlling the incrementing of said number of cells to be retransmitted and, when said sum is lower than said buffer memory capacity, the transfer of said address of said first frame cell from said context memory to said associated read addressing means.

3. A switching relay as claimed in claim 1, comprising means cyclically receiving first-cell addresses respectively read in said read addressing means for deducing, for each frame being written in said buffer memory, said addresses of said cells of said frame as a function of said address of said first cell of said frame.

4. The switching relay as claimed in claim 3, wherein said last cell of a frame is marked by a particular word and wherein said switching relay comprises means for authorizing the deduction of addresses of said cells in a frame being read and means for inhibiting said reading in said write addressing means associated with said output path for which said frame is destined, as long as said particular word of said last cell of said frame has not been detected.

5. The switching relay as claimed in claim 4, comprising:

means for detecting in each of said multiplexed cells a cell type word thereby deriving a start-of-frame signal in response to a first cell in a frame containing several cells or in response to a cell comprising a complete frame, and an end-of-frame signal in response to a last cell in a frame containing several cells or in response to a cell containing a complete frame, for each input path, the respective start-of-frame signal controlling the writing of said destination output path address and said address of said first frame cell in said context memory, as well as the resetting of said frame cell number, for each output path, said end-of-frame signal controlling the incrementing of said number of cells to be retransmitted and, when said sum is lower than said buffer memory capacity, the transfer of said address of said first frame cell from said context memory to said associated read addressing means.

means for inhibiting any start-of-frame or end-of-frame signal in response to an empty cell indicating word included in said multiplexed cells, and means for inserting an empty cell indicating word destined for an output path when said read addressing means associated with said output path is devoid of any memorized cell address.

6. The switching relay claimed in claim 1, wherein each cell is divided into a predetermined number of words, and each of said multiplexed cells is gradually memorized word by word in said buffer memory, and wherein the address of the first cell of a frame is constituted by said address of said first word of said first cell of said frame.

* * * * *

UNITED STATES PATENT AND TRADEMARK OFFICE
CERTIFICATE OF CORRECTION

PATENT NO. : 5,237,564
DATED : August 17, 1993
INVENTOR(S) : Albert Lespagnol; Jean-Paul Quinquis It is certified that error appears in the above-identified patent and that said Letters Patent is hereby corrected as shown below:

Title page, item
(75) Inventors: Please delete "Quinouis" and insert "Quinquis"

Signed and Sealed this

Twenty-ninth Day of March, 1994

BRUCE LEHMAN

*Attest:*

*Attesting Officer*     *Commissioner of Patents and Trademarks*